United States Patent
Bransom et al.

(10) Patent No.: US 9,787,669 B2
(45) Date of Patent: Oct. 10, 2017

(54) IDENTITY AUTHENTICATION USING CREDENTIALS

(71) Applicant: Comcast Cable Communications, LLC, Philadelphia, PA (US)

(72) Inventors: Kris Bransom, Voorhees, NJ (US); Christopher Zarcone, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 213 days.

(21) Appl. No.: 13/826,777

(22) Filed: Mar. 14, 2013

(65) Prior Publication Data
US 2014/0281498 A1 Sep. 18, 2014

(51) Int. Cl.
*H04L 29/06* (2006.01)
*H04L 9/32* (2006.01)

(52) U.S. Cl.
CPC ............ *H04L 63/083* (2013.01); *H04L 9/321* (2013.01); *H04L 9/3226* (2013.01); *H04L 9/3247* (2013.01); *H04L 9/3263* (2013.01); *H04L 9/3297* (2013.01); *H04L 63/0823* (2013.01); *H04L 2463/061* (2013.01)

(58) Field of Classification Search
CPC . H04L 63/083; H04L 63/0823; H04L 9/3226; H04L 9/3247; H04L 9/321
USPC ................................ 726/2, 4; 713/155, 156
See application file for complete search history.

(56) References Cited

U.S. PATENT DOCUMENTS

| | | | |
|---|---|---|---|
| 6,310,966 B1* | 10/2001 | Dulude .................. | G06Q 20/04 382/115 |
| 7,069,438 B2* | 6/2006 | Balabine et al. ............. | 713/168 |
| RE42,811 E * | 10/2011 | Nakazawa ........ | H04L 29/12009 707/770 |
| 8,392,712 B1* | 3/2013 | Wilson .......................... | 713/175 |
| 2002/0029337 A1* | 3/2002 | Sudia et al. .................. | 713/176 |
| 2002/0095569 A1* | 7/2002 | Jerdonek ....................... | 713/155 |
| 2002/0138582 A1* | 9/2002 | Chandra et al. .............. | 709/206 |
| 2003/0056096 A1* | 3/2003 | Albert ...................... | G06F 21/31 713/168 |
| 2003/0140230 A1* | 7/2003 | de Jong .............. | H04L 63/0407 713/182 |

(Continued)

FOREIGN PATENT DOCUMENTS

WO    WO 2011124057 A1 * 10/2011

OTHER PUBLICATIONS

S. Josefsson, "The Base16, Base32, and Base64 Data Encodings", RFC 4648, Oct. 2006, pp. 1-18.

(Continued)

*Primary Examiner* — Hadi Armouche
*Assistant Examiner* — Sher A Khan
(74) *Attorney, Agent, or Firm* — Banner & Witcoff, Ltd.

(57) ABSTRACT

A method and system may allow for authenticating a computing device. A computing device may send an authentication request over a network to an authentication computing device. The authentication request may include a user name and a password. The user name may include a credential and the password may be a digitally signed version of the user name. The authentication computing device may authenticate the requesting computing device by decrypting the password and comparing the received user name to the decrypted password.

16 Claims, 7 Drawing Sheets

(56) References Cited

U.S. PATENT DOCUMENTS

| | | | |
|---|---|---|---|
| 2003/0217165 A1* | 11/2003 | Buch | H04L 29/06027 709/229 |
| 2006/0136740 A1* | 6/2006 | Smith | G06F 21/31 713/184 |
| 2006/0271496 A1* | 11/2006 | Balasubramanian | G06Q 20/04 705/64 |
| 2007/0074027 A1* | 3/2007 | Tung | H04L 9/3247 713/176 |
| 2007/0101401 A1* | 5/2007 | Genty et al. | 726/3 |
| 2007/0133803 A1* | 6/2007 | Saito | H04L 29/12066 380/267 |
| 2007/0168656 A1* | 7/2007 | Paganetti | G06F 21/31 713/155 |
| 2007/0192843 A1* | 8/2007 | Peterson et al. | 726/10 |
| 2008/0067240 A1* | 3/2008 | Nakano et al. | 235/380 |
| 2008/0072311 A1* | 3/2008 | Mullick | H04L 63/0272 726/15 |
| 2008/0113677 A1* | 5/2008 | Madnawat | 455/466 |
| 2009/0046311 A1* | 2/2009 | Asai | G06F 21/608 358/1.9 |
| 2009/0094383 A1* | 4/2009 | Hinton et al. | 709/250 |
| 2009/0238213 A1* | 9/2009 | Kasatani | H04N 1/00344 370/503 |
| 2009/0285399 A1* | 11/2009 | Schneider | 380/278 |
| 2009/0307140 A1* | 12/2009 | Mardikar | G06Q 20/1085 705/71 |
| 2010/0122331 A1* | 5/2010 | Wang | G06F 21/31 726/6 |
| 2010/0131756 A1* | 5/2010 | Schneider | 713/155 |
| 2010/0325005 A1* | 12/2010 | Benisti | G06Q 10/107 705/26.1 |
| 2011/0107396 A1* | 5/2011 | Ozaki | G06F 21/34 726/2 |
| 2011/0276495 A1* | 11/2011 | Varadarajan et al. | 705/71 |
| 2012/0093386 A1* | 4/2012 | Devadas et al. | 382/132 |
| 2012/0226815 A1* | 9/2012 | Goodman et al. | 709/228 |
| 2013/0036459 A1* | 2/2013 | Liberman | H04L 9/0866 726/6 |
| 2014/0068726 A1* | 3/2014 | Jakobsson | G06F 21/31 726/5 |

OTHER PUBLICATIONS

D. Cooper et al., "Internet X.509 Public Key Infrastructure Certificate and Certificate Revocation List (CRL) Profile", RFC 5280, May 2008, pp. 1-27.

Timothy D. Morgan, "HTTP Digest Integrity, Another look, in light of recent attacks", Jan. 5, 2010, VRS, pp. 1-8.

Welcome to iWay Release 6.0 Documentation, iWay Software, 2011.

How to require username + certificate with apache? Careers 2.0, Internet Archive, Dec. 24, 2011.

* cited by examiner

IDENTITY AUTHENTICATION USING CREDENTIALS

BACKGROUND

Authentication has become a complex problem for modern day networks. For example, a request from an unknown computing device often cannot be properly handled until the unknown computing device is identified. In some cases, a trusted authority, such as a certificate authority, is leveraged to verify a computing device's identity. The trusted authority may issue a credential, such as a digital certificate, to a computing device and the credential may be used by the computing device for authentication purposes. Technologies, such as Secure Sockets Layer (SSL) and its successor, Transport Layer Security (TLS), leverage digital certificates and are available to increase the authentication capabilities of a system. However, implementing a full SSL/TLS system, or other complex authentication systems, can be cumbersome and costly.

SUMMARY

The following summary is for illustrative purposes only, and is not intended to limit or constrain the detailed description.

In some embodiments, a credential may be retrieved from a trusted authority, for example a certificate authority. The credential may be used to generate first authentication information and second authentication information, for example a user name and a password. The user name may comprise the credential retrieved from the trusted authority, where the credential includes a public key. The password may comprise a digitally signed version of the user name, where the digital signature is based on a private key. The user name and password may be transmitted to an authentication computing device.

In some embodiments, first authentication information and second authentication information may be received from a computing device requesting authentication, where the first authentication information and second authentication information comprise a user name and password. The user name may be converted and a credential that includes a public key may be extracted from the user name. The password may be decoded and may be decrypted based on the public key extracted from the user name. The user name and password may be authenticated by comparing the decrypted password to the extracted credential. If the comparison results in a match, the computing device may be authenticated.

In some embodiments, the user name comprises supplemental information concatenated to the retrieved credential. The supplemental information may comprise a time stamp generated at the time the user name is generated. The time stamp may be extracted from the user name. After the user name and password are compared, the time stamp may be verified in order to complete authentication. The time stamp may be verified by comparing the extracted time stamp to previously received time stamps for that computing device. If the extracted time stamp is different from the previously received time stamps for the computing device, the extracted time stamp may be confirmed.

As noted above, this Summary is merely a summary of some of the features described herein. It is not exhaustive, and it is not to be a limitation on the claims. Further embodiments are described below.

BRIEF DESCRIPTION OF THE DRAWINGS

Aspects of the present disclosure are described by way of example with respect to the accompanying figures in which like numerals indicate similar elements.

DETAILED DESCRIPTION

In the following description, reference is made to the accompanying figures, in which are shown various illustrative embodiments. It is to be understood that other embodiments may be utilized and structural and functional modifications may be made, without departing from the scope of the present disclosure.

Figure 1:
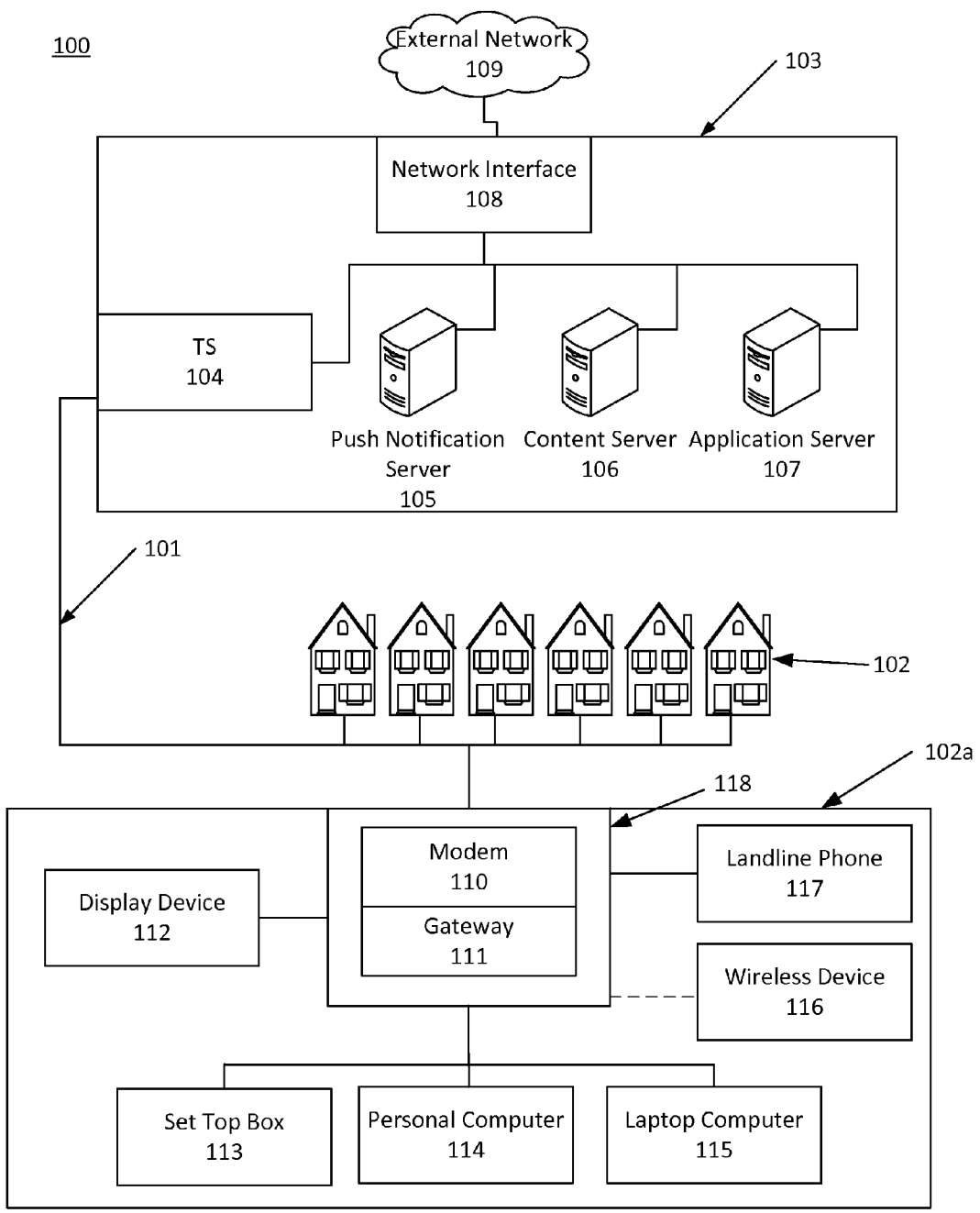
FIG. 1 illustrates an example communication network according to one or more embodiments.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., headend, central office, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components (not illustrated) such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network. The network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push notification server 105, content server 106, and application server 107 may be combined. Further, here the push notification server 105, content server 106, and application server 107 are shown generally, and it will be understood that they may each contain memory storing computer executable instructions to cause a processor to perform steps described herein and/or memory for storing data.

An example premises 102a, such as a home, may include an interface 118. The interface 118 can include any communication circuitry needed to allow a device to communicate on one or more links 101 with other devices in the network. For example, the interface 118 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 118. Further, the interface 118 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, Universal Serial Bus (USB) interfaces, wireless interfaces (e.g., IEEE 802.11, IEEE 802.15), analog twisted pair interfaces, Bluetooth interfaces, and others.

Figure 2:
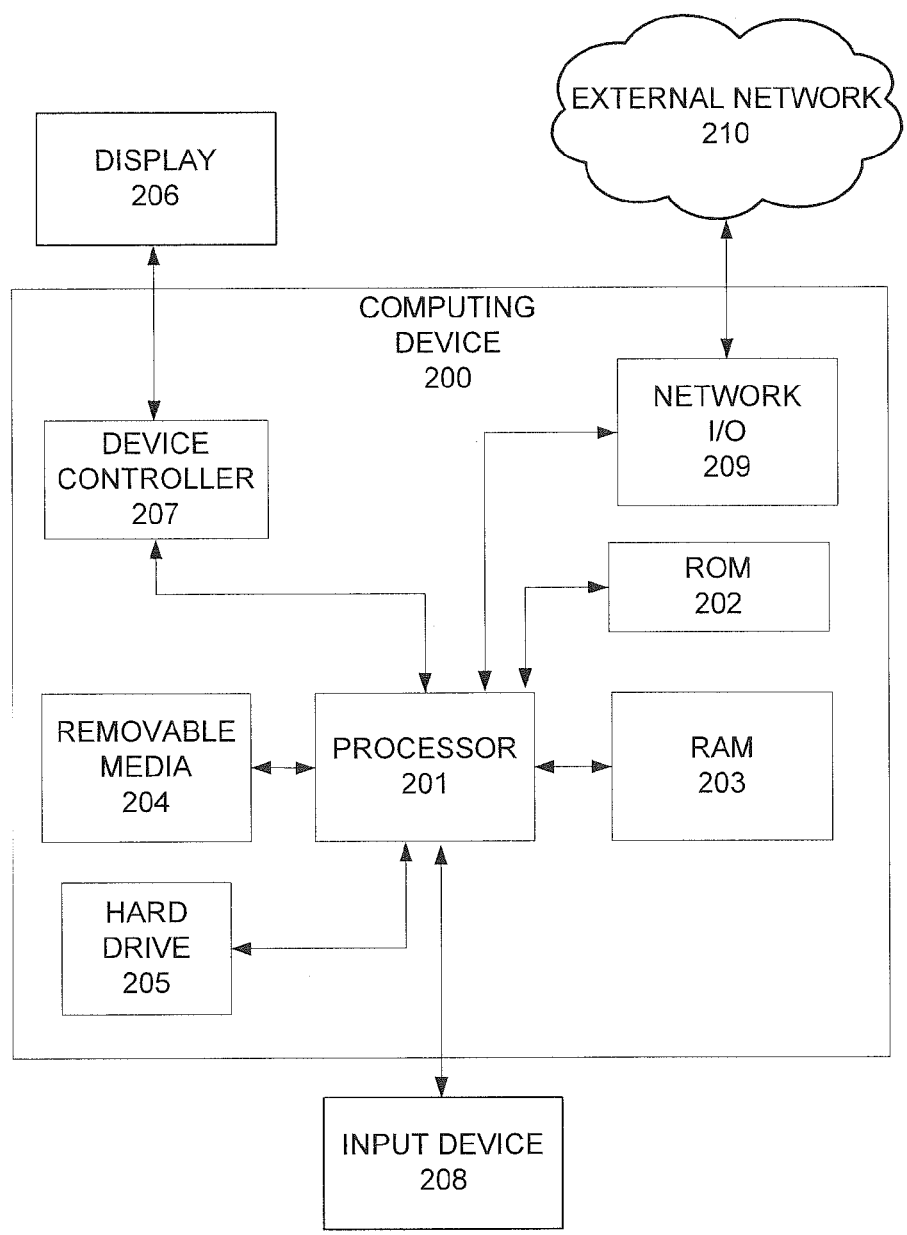
FIG. 2 illustrates an example computing device according to one or more embodiments.

FIG. 2 illustrates hardware elements that can be used to implement any of the various computing devices discussed herein. For example, a device such as computing device 200 may be used to implement push notification server 105, content server 106, application server 107, terminal system 104, network interface 118, gateway 111, set top box 113, personal computer 114, laptop computer 115 or wireless device 116. The computing device 200 may include one or more processors 201, which may execute instructions of a computer program to perform any of the features described herein. The instructions may be stored in a computer-readable medium or memory, to configure the operation of the processor(s) 201. For example, instructions may be stored in a read-only memory (ROM) 202, random access memory (RAM) 203, removable media 204, such as a Universal Serial Bus (USB) drive, compact disc (CD) or digital versatile disk (DVD), floppy disk drive, or other removable storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card, wireless transceiver, etc.) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101, the external network 109, an in-home network, a wireless, coaxial, fiber, or hybrid fiber/coaxial distribution system (e.g., a DOCSIS network), or other network.

The FIG. 2 hardware configuration is one example. Modifications may be made to add, remove, combine, divide, etc. components of the computing device 200 into different arrangements. Additionally, the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the components described herein may be a combination of hardware and software, and may co-exist in a common physical platform (e.g., a requesting entity can be a separate software process and program from the requesting entity, both of which may be executed as software on a common computing device).

One or more aspects of the disclosure may be embodied in computer-usable data and/or computer-executable instructions, such as in one or more program modules, executed by one or more computers or other devices. Program modules may include routines, programs, objects, components, data structures, etc. that perform particular tasks or implement particular data types when executed by a processor in a computer or other data processing device. The computer executable instructions may be stored on one or more computer readable media such as a hard disk, optical disk, removable storage media, solid state memory, RAM, etc. In various embodiments, the functionality of the program modules may be combined or distributed across multiple computing devices. In addition, the functionality over the various embodiments described herein may be embodied in whole or in part in firmware or hardware equivalents such as integrated circuits, field programmable gate arrays (FPGA), and the like.

Figure 3:
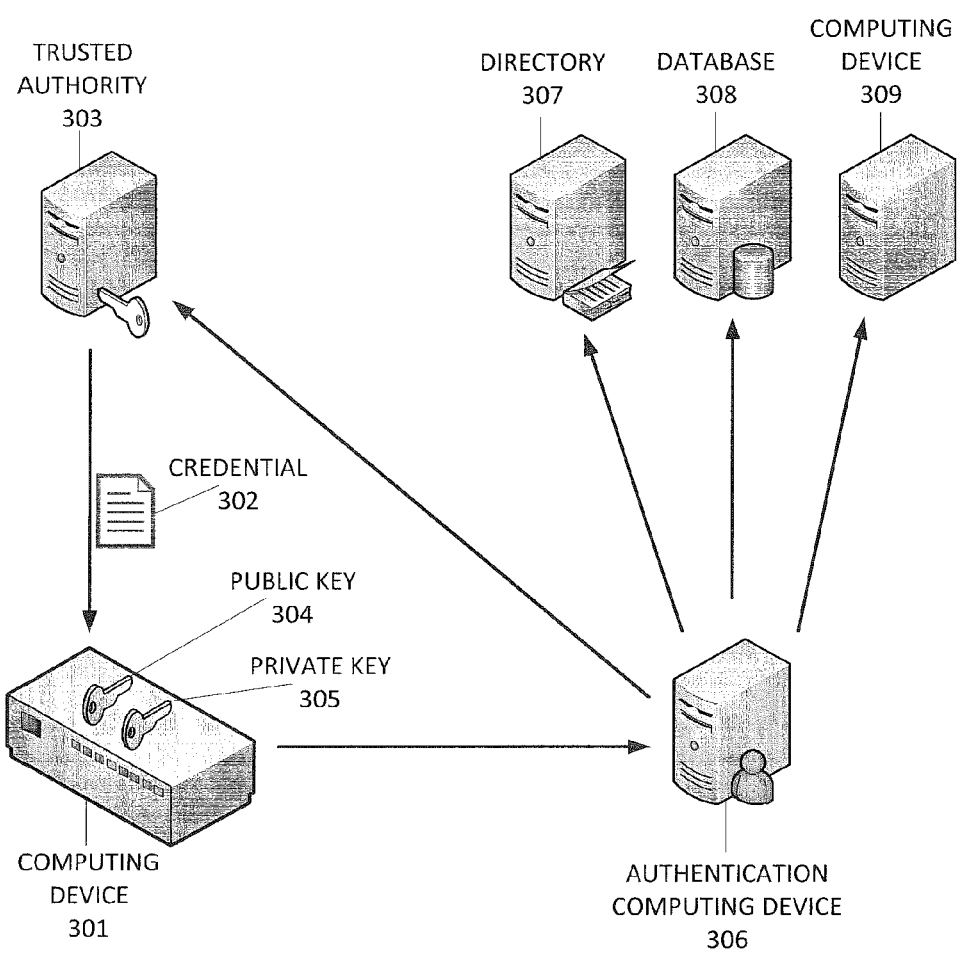
FIG. 3 illustrates an example system for authenticating a computing device according to one or more embodiments.

An example system of authenticating a computing device is described further below with reference to FIG. 3. In some embodiments, the system may comprise computing device 301 (e.g., customer premises equipment 102a from FIG. 1), credential 302 (e.g., digital certificate, PKI, etc.), trusted authority 303 (e.g., certificate authority), public key 304, private key 305, authentication computing device 306 (e.g., one or more of servers 105-107 from FIG. 1), directory 307, database 308, and computing device 309 (e.g., server). An example system is described for authenticating customer premises equipment (e.g., a set-top box). In some embodiments, the device seeking authentication may be any suitable computing device (e.g., client computing device, peer computing device, etc.) that seeks authentication in an authentication system.

In an example, computing device 301 may comprise customer premises equipment 102a from FIG. 1 and authentication computing device 306 may comprise one or more of servers 105-107 in or attached to local office 103. Computing device 301 may provide credentials (e.g., digital certificate, public key, etc.) to authentication computing device 306. In some embodiments, authentication computing device 306 and computing device 301 implement a username and password authentication policy. In this embodiment, first authentication information may comprise a user name and second authentication information may comprise a password. Computing device 301 may provide one or more credentials via the user name and password to authentication computing device 306 and the one or more credentials may be authenticated by authentication computing device 306. In an example, computing device 301 and authentication computing device 306 are associated with a service provider, e.g., a cable/internet service provider. In another example, the authentication computing device 306 has no prior knowledge of computing device 301.

In some embodiments, computing device 301 and authenticating computing device 306 implement a public key cryptography system. For example, public key 304 and private key 305 may comprise a set of asymmetric keys. When data is encrypted using private key 305, public key 304 may be used to decrypt the data. For example, a digital signature for computing device 301 may comprise hashing data prior to transmission, e.g., based on a 256-bit secure hash algorithm (SHA), and then encrypting the digest of the hash with private key 305. The digital signature may be decrypted using public key 304. Any other suitable hashing algorithm (e.g., SHA-224, any hash algorithm published by the National Institute of Standards and Technology, etc.) may be used.

An example process of authenticating a computing device is described further below in FIGS. 4-7 with reference to FIG. 3. In an example, computing device 301 may be unprovisioned and may seek provisioning from a provisioning service (e.g., local office 103). In some embodiments, the authentication processes described may comprise a portion of a request for provisioning. In other embodiments, the authentication processes described may be implemented as a stand-alone authentication system that may be leveraged by any suitable system that employs authentication services.

Figure 4:
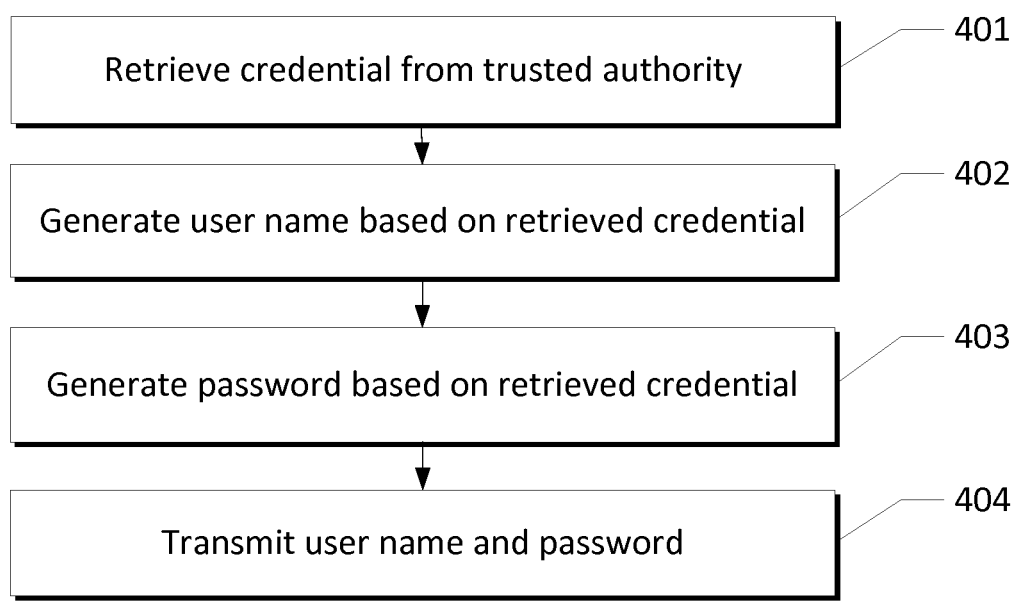
FIG. 4 illustrates an example process for requesting authentication for a computing device according to one or more embodiments.

FIG. 4 illustrates the steps performed by computing device 301 in some embodiments. The process of FIG. 4 may begin at step 401, where a credential may be retrieved from a trusted authority. In an example, computing device 301 may retrieve a credential from trusted authority 303.

In some embodiments, trusted authority 303 comprises a certificate authority (e.g., Symantec®, VeriSign®, Entrust®, DigiCert®, etc.) that issues digital certificates to entities (e.g., a computing device). The digital certificate may comprise an X.509 v3 digital certificate that includes a public key and metadata about the entity issued the certificate. The digital certificate may be used to bind the public key included in the digital certificate with the entity described by the metadata in the digital certificate. For example, credential 302 may comprise a digital certificate that binds public key 304 with computing device 301.

A digital certificate may also be used to authenticate a digital signature from an unknown sender based on public key verification. A digital signature may comprise a hash digest that is encrypted using a private key. Data digitally signed by computing device 301 using private key 305 may be authenticated based on credential 302. For example, a digital certificate for computing device 301 (e.g., credential 302) may include public key 304, which may be used to decrypt a digital signature for computing device 301.

In some embodiments, at step 401, computing device 301 is issued a credential 302 (e.g., digital certificate) from trusted authority 303 (e.g., certificate authority). For example, a pair of asymmetric keys (e.g., public key 304 and private key 305) may be generated for computing device 301. During this generation, a certificate signing request (CSR) may also be generated. The CSR may comprise the generated public key 304 and additional identification information (e.g., a business/organization name, a department name, a location (town/city), etc.). For instance, the CSR may be formatted according to one or more syntaxes commonly known in the art (e.g., PKCS#10 Specification, SPKAC, etc.). After generation, the CSR may be forwarded to trusted authority 303.

In some embodiments, trusted authority 303 replies to the CSR by sending a digital certificate (e.g., credential 302) corresponding to the CSR. The digital certificate may comprise information included in the CSR (e.g., public key 304 and additional identification information) that has been digitally signed by the trusted authority. The digital certificate (e.g., credential 302) and the generated private key (e.g., private key 305) may then be stored in a storage device at computing device 301. In some embodiments, credential 302 may comprise any type of credential that includes a public key (e.g., a public key with accompanying metadata, a digital certificate, etc.)

In some embodiments, trusted authority 303 (e.g., certificate authority) may generate credential 302 (e.g., digital certificate) and send the generated certificate to computing device 301. For example, trusted authority 303 may generate public key 304, private key 305, and credential 302 and subsequently send the generated keys and credential to computing device 301. In this embodiment, the generated certificate may be sent to the computing device as part of a PKCS #12 bundle.

An example digital certificate in human readable format is illustrated below:

```
Certificate:
    Data:
        Version: 1 (0x0)
        Serial Number:
            d4:e2:d9:03:5a:7f:b6:17
        Signature Algorithm: sha1WithRSAEncryption
        Issuer: C=US, ST=NJ, L=Moorestown, O=Comcast, OU=IIS, CN=server
        Validity
            Not Before: Jun 12 16:00:15 2012 GMT
            Not After : Jun 12 16:00:15 2013 GMT
        Subject: C=US, ST=NJ, L=Moorestown, O=Comcast, OU=IIS, CN=server
        Subject Public Key Info:
            Public Key Algorithm: rsaEncryption
                Public-Key: (2048 bit)
                Modulus:
                    00:fb:6b:ff:93:84:99:11:7d:8d:d2:14:e4:bd:4f:
                    c6:2f:4b:11:a8:cf:d9:92:ac:fb:9d:39:6e:ab:a7:
                    4d:36:99:cf:6b:e4:e2:f0:21:48:8d:b9:08:8c:fd:
                    60:96:2b:24:39:95:a8:a5:08:a2:65:0f:b8:31:13:
                    96:43:28:6b:66:29:fb:9e:62:87:73:f1:bf:bc:5c:
                    f4:73:84:c3:18:74:d8:cc:b7:78:c4:64:e8:27:b6:
                    4c:7a:70:11:bc:d8:96:10:68:e3:07:bb:57:b2:ab:
                    47:33:a7:cb:48:6c:10:7a:3f:be:0d:16:29:c0:54:
                    55:04:1e:7f:b9:79:5b:94:9c:66:cd:76:8d:18:ca:
                    32:62:b1:76:78:13:27:5d:ff:e6:7d:0b:4c:9d:e7:
                    55:4e:0d:15:86:36:0e:60:6c:bb:da:c1:7f:9a:dc:
                    ba:c7:2f:d3:11:70:06:13:05:73:e1:c0:23:6d:18:
                    f5:e7:37:3f:60:7e:d4:83:a0:85:d5:66:55:89:84:
                    03:5d:01:5f:f9:b1:05:6a:4e:dc:3c:fb:de:1a:ea:
                    42:ce:76:22:ec:95:fe:81:05:11:9c:d5:56:24:80:
                    97:af:6f:1f:68:49:a6:64:25:89:bd:24:2f:85:42:
                    49:c3:4e:7b:06:d4:34:81:90:a3:15:04:68:b0:41:
                    d4:01
                Exponent: 65537 (0x10001)
        Signature Algorithm: sha1WithRSAEncryption
            b7:e2:16:da:7a:2b:93:6c:6e:bd:21:d9:39:e5:ef:9a:68:d5:
            24:19:3d:b4:12:ba:5d:9e:1c:0d:5b:d4:ee:0a:67:ae:d3:19:
            40:24:89:3a:9a:f8:15:98:a8:79:e6:71:57:b9:89:6e:8a:e7:
            00:af:b7:95:1b:80:1e:cc:e3:dd:64:f2:7c:46:15:97:6d:57:
            79:12:6b:a4:b0:0a:09:f5:97:9d:ba:f5:ba:c3:86:ed:98:02:
            b5:4e:a2:61:2d:e5:92:de:61:ee:45:09:62:fc:5e:2e:a9:bc:
            be:e0:b1:b3:76:19:c9:83:bd:87:87:b8:04:ff:4:a8:2d:4f:
            f1:96:d6:8d:f2:34:62:58:fd:0f:6d:dc:77:28:29:52:77:15:
            d7:dd:83:7c:ba:b8:12:6f:ab:3f:19:0b:bd:14:e7:d9:5f:a1:
            47:71:a7:6f:4b:36:27:f8:f1:8b:12:71:6f:32:78:28:ca:48:
            a7:f7:b7:c4:43:52:d4:24:4b:8f:ac:29:2d:ce:41:7a:12:f5:
            c7:a0:a0:1c:57:5c:62:6a:8a:c4:83:98:c8:5c:08:2b:59:a4:
            85:e6:13:c8:d4:80:43:59:0c:46:24:7c:81:63:8f:2c:6c:ef:
            c8:a4:22:b0:51:ae:3c:41:c5:8a:3e:95:f8:1b:be:62:66:a3:
            97:2b:ce:c7
-----BEGIN CERTIFICATE-----
MIIDPDCCAiQCCQDU4tkDWn+2FzANBgkqhkiG9w0BAQUFADBgMQswCQYDV
QQGEwJVUzELMAkGA1UECAwCTkoxEzARBgNVBAcMCk1vb3Jlc3Rvd24xEDA
OBgNVBAoMB0NvbWNhc3QxDDAKBgNVBAsMA0lJUzEPMA0GA1UEAwwGc2
VydmVyMB4XDTEyMDYxMjE2MDAxNVoXDTEzMDYxMjE2MDAxNVowYDEL
MAkGA1UEBhMCVVMxCzAJBgNVBAgMAk5KMRMwEQYDVQQHDApNb29yZ
XN0b3duMRAwDgYDVQQKDAdDb21jYXN0MQwwCgYDVQQLDANJSVMxDzA
NBgNVBAMMBnNlcnZlcjCCASIwDQYJKoZIhvcNAQEBBQADggEPADCCAQoCg
gEBAPtr/5OEmRF9jdIU5L1Pxi9LEajP2ZKs+505bqunTTaZz2vk4vAhSI25CIz9YJYrJ
DmVqKUIomUPuDETlkMoa2Yp+55ih3Pxv7xc9HOEwxh02My3eMRk6Ce2THpwEbz
```

-continued

```
YlhBo4we7V7KrRzOny0hsEHo/vg0WKcBUVQQef7l5W5ScZs12jRjKMmKxdngTJ13
/5n0LTJ3nVU4NFYY2DmBsu9rBf5rcuscv0xFwBhMFc+HAI20Y9ec3P2B+1IOghdV
mVYmEA10BX/mxBWpO3Dz73hrqQs52IuyV/oEFEZzVViSAl69vH2hJpmQlib0kL4
VCScNOewbUNIGQoxUEaLBB1AECAwEAATANBgkqhkiG9w0BAQUFAAOCAQ
EAt+IW2nork2xuvSHZOeXvmmjVJBk9tBK6XZ4cDVvU7gpnrtMZQCSJOpr4FZioee
ZxV7mJbornAK+3lRuAHszj3WTyfEYVl21XeRJrpLAKCfWXnbr1usOG7ZgCtU6iYS
3lkt5h7kUJYvxeLqm8vuCxs3YZyYO9h4e4BP/0qC1P8ZbWjfI0Ylj9D23cdygpUncV19
2DfLq4Em+rPxkLvRTn2V+hR3Gnb0s2J/jxixJxbzJ4KMpIp/e3xENS1CRLj6wpLc5Beh
L1x6CgHFdcYmqKxIOYyFwIK1mkheYTyNSAQ1kMRiR8gWOPLGzvyKQisFGuPE
HFij6V+Bu+YmajlyvOxw==
-----END CERTIFICATE-----
```

After step 401, the process may proceed to step 402, where a user name is generated based on retrieved credential 302. In an example, the user name may comprise retrieved credential 302 (e.g., digital certificate). In some embodiments, step 402 of FIG. 4 comprises the process illustrated in FIG. 5A.

Figure 5A:
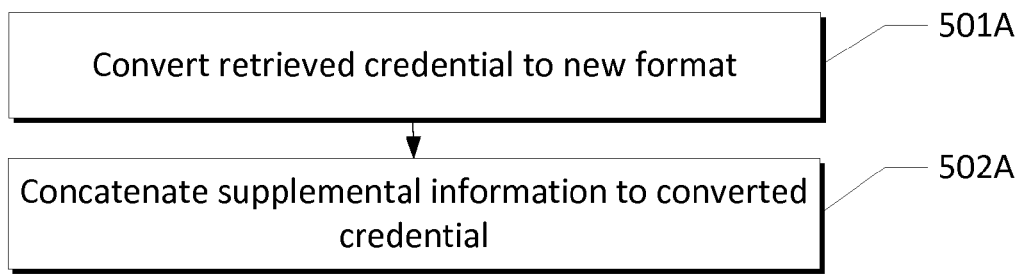
FIGS. 5A and 5B illustrate an example process for processing authentication information according to one or more embodiments.

FIG. 5A illustrates a process for generating a user name in accordance with some embodiments. The process may begin at step 501A, where retrieved credential 302 (e.g., digital certificate) may be converted to a new format. Credential 302 may be converted to a privacy enhanced mail (PEM) format or any other suitable format. In some embodiments, credential 302 is stripped of new line characters, delimiters (e.g., "-----BEGIN CERTIFICATE-----" and "-----END CERTIFICATE-----"), and other extraneous data. An example certificate converted into PEM format and stripped of extraneous data is illustrated below:

```
MIIDPDCCAiQCCQDU4tkDWn+2FzANBgkqhkiG9w0BAQUFADB
gMQswCQYDVQQGEwJVUzELMAkGA1UECAwCTkoxEzARBgNV
BAcMCk1vb3Jlc3Rvd24xEDAOBgNVBAoMB0NvbWNhc3QxDDAKB
gNVBAsMA0lJUzEPMA0GA1UEAwwGc2VydmVyMB4XDTEyMDYx
MjE2MDAxNVoXDTEzMDYxMjE2MDAxNVowYDELMAkGA1UEBh
MCVVMxCzAJBgNVBAgMAk5KMRMwEQYDVQQHDApNb29yZXN
0b3duMRAwDgYDVQQKDAdDb21jYXN0MQwwCgYDVQQLDANJS
VMxDzANBgNVBAMMBnNlcnZlcjCCASIwDQYJKoZIhvcNAQEBBQ
ADggEPADCCAQoCggEBAPtr/5OEmRF9jdIU5L1Pxi9LEajP2ZKs+
505bqunTTaZz2vk4vAhSI25CIz9YJYrJDmVqKUIomUPuDETlkMoa2
Yp+55ih3Pxv7xc9HOEwxh02My3eMRk6Ce2THpwEbzYlhBo4we7
V7KrRzOny0hsEHo/vg0WKcBUVQQef7l5W5ScZs12jRjKMmKxdng
TJ13/5n0LTJ3nVU4NFYY2DmBsu9rBf5rcuscv0xFwBhMFc+HAI2
0Y9ec3P2B+1IOghdVmVYmEA10BX/mxBWpO3Dz73hrqQs52Iuy
V/oEFEZzVViSAl69vH2hJpmQlib0kL4VCScNOewbUNIGQoxUEaL
BB1AECAwEAATANBgkqhkiG9w0BAQUFAAOCAQEAt+IW2no
rk2xuvSHZOeXvmmjVJBk9tBK6XZ4cDVvU7gpnrtMZQCSJOpr4FZ
ioeeZxV7mJbornAK+3lRuAHszj3WTyfEYVl21XeRJrpLAKCfWXn
br1usOG7ZgCtU6iYS3lkt5h7kUJYvxeLqm8vuCxs3YZyYO9h4e4BP/
0qC1P8ZbWjfI0Ylj9D23cdygpUncV192DfLq4Em+rPxkLvRTn2
V+hR3Gnb0s2J/jxixJxbzJ4KMpIp/e3xENS1CRLj6wpLc5BehL1
x6CgHFdcYmqKxIOYyFwIK1mkheYTyNSAQ1kMRiR8gWO
PLGzvyKQisFGuPEHFij6V+Bu+YmajlyvOxw==
```

In some embodiments, supplemental information is used to verify an authentication request. For example, the supplemental information may comprise a time stamp that indicates a timing for the authentication request. In another example, the supplemental information may comprise a random number.

The process of FIG. 5A may proceed from step 501A to step 502A, where supplemental information is concatenated to the converted credential. In an example, the supplemental information may comprise a time stamp and the time stamp may comprise a best estimate of the Coordinated Universal Time (UTC) by the computing device 301 at the time of generating the user name. The time stamp may comprise an 18 character time stamp that represents the UTC date and time to the subsecond. In an example, the time stamp may be stripped of special characters. For instance, an 18 character example UTC time stamp 2012-06-17T23:20:50.52Z may be reformatted to 20120617T23205052Z.

In an example, a user name generated by the process of FIG. 5A is illustrated below:

```
20120617T23205052ZMIIDPDCCAiQCCQDU4tkDWn+
2FzANBgkqhkiG9w0BAQUFADBgMQswCQYDVQQGEwJVUz
ELMAkGA1UECAwCTkoxEzARBgNVBAcMCk1vb3Jlc3Rvd24x
EDAOBgNVBAoMB0NvbWNhc3QxDDAKBgNVBAsMA0lJUzE
PMA0GA1UEAwwGc2VydmVyMB4XDTEyMDYxMjE2MDAxNV
oXDTEzMDYxMjE2MDAxNVowYDELMAkGA1UEBhMCVVMxC
zAJBgNVBAgMAk5KMRMwEQYDVQQHDApNb29yZXN0b3du
MRAwDgYDVQQKDAdDb21jYXN0MQwwCgYDVQQLDANJSV
MxDzANBgNVBAMMBnNlcnZlcjCCASIwDQYJKoZIhvcNAQEBB
QADggEPADCCAQoCggEBAPtr/5OEmRF9jdIU5L1Pxi9LEajP
2ZKs+505bqunTTaZz2vk4vAhSI25CIz9YJYrJDmVqKUIomUP
uDETlkMoa2Yp+55ih3Pxv7xc9HOEwxh02My3eMRk6Ce2T
HpwEbzYlhBo4we7V7KrRzOny0hsEHo/vg0WKcBUVQQef7l5W
5ScZs12jRjKMmKxdngTJ13/5n0LTJ3nVU4NFYY2DmBsu9rBf
5rcuscv0xFwBhMFc+HAI20Y9ec3P2B+1IOghdVmVYmE
A10BX/mxBWpO3Dz73hrqQs52IuyV/oEFEZzVViSAl69vH2hJ
pmQlib0kL4VCScNOewbUNIGQoxUEaLBB1AECAwEAATAN
BgkqhkiG9w0BAQUFAAOCAQEAt+IW2nork2xuvSHZOeXv
mmjVJBk9tBK6XZ4cDVvU7gpnrtMZQCSJOpr4FZioeeZxV7m
JbornAK+3lRuAHszj3WTyfEYVl21XeRJrpLAKCfWXnbr1us
OG7ZgCtU6iYS3lkt5h7kUJYvxeLqm8vuCxs3YZyYO9h4e4BP/
0qC1P8ZbWjfI0Ylj9D23cdygpUncV192DfLq4Em+rPxkLvRT
n2V+hR3Gnb0s2J/jxixJxbzJ4KMpIp/e3xENS1CRLj6wpLc5
BehL1x6CgHFdcYmqKxIOYyFwIK1mkheYTyNSAQ1kMRiR8g
WOPLGzvyKQisFGuPEHFij6V+Bu+YmajlyvOxw==
```

The process of FIG. 4 may proceed from step 402 to step 403, where a password may be generated based on the retrieved credential. In an example, the password may comprise retrieved credential 302 (e.g., digital certificate). In some embodiments, step 403 of FIG. 4 comprises the process illustrated in FIG. 5B.

Figure 5B:
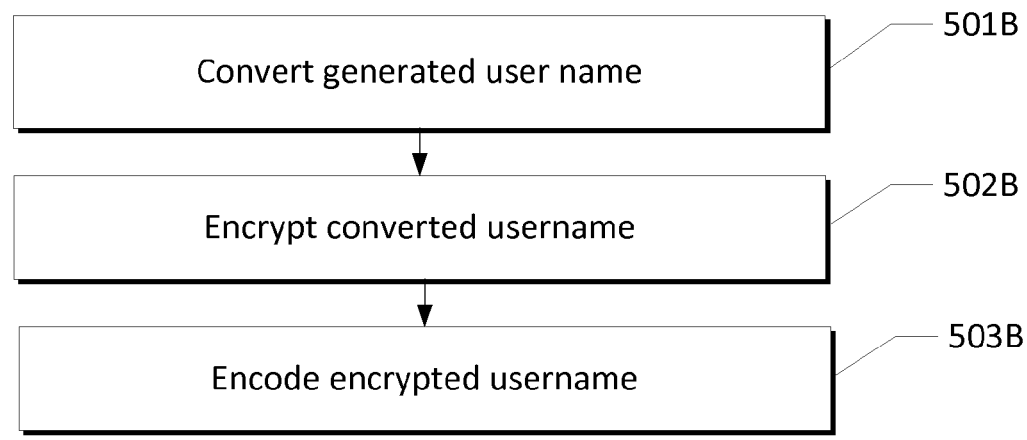

FIG. 5B illustrates a process for generating a password in accordance with some embodiments. In an example, the password generated in FIG. 5B may comprise an encoded digital signature of the user name. The process may begin a step 501B, where the user name generated in step 402 is converted. For example, the user name may be converted based on a 256-bit secure hash algorithm (SHA). Any other suitable algorithm (e.g., SHA-224, any hash algorithm published by the National Institute of Standards and Technology, etc.) may be used.

The process of FIG. 5B may proceed from step 501B to step 502B, where the converted user name is encrypted. The converted user name may be encrypted using private key 305. In an example, after step 502B, the generated encryption may comprise a digitally signed version of the user name generated by the process of FIG. 5A.

The process of FIG. 5B may proceed from step 502B to step 503B, where the encrypted password is encoded. In an example, the encrypted password is encoded using a Base64 encoding scheme. While an encoding scheme that translates binary data into a radix-64 representation is described, any suitable encoding scheme may be used. In an example, after the process of FIG. 5B, the password may comprise an encoded digitally signed version of the user name.

In an example, a password generated by the process of FIG. 5B may comprise:

---

ByWyZVujvw+zsjl1VPAicWOFuzGnXIOcQ8oFLuWSlnyMbH
FXntH73Kcb06rUNgTUP9ZpEmcetINjjpOl+Td5wNCKUMMflV
UU+Ht+2Fke8wCYuuLq44So8ha3nApyOojMNCYqFdxdZ/
ZO47ikiAaiQ+pmNMTAcNCJtZo25gooA0gGizwJ0Ii2Mq+
ebg0N7LKRxwBsElshm8NKoRGPUyCN/copw18zVGcIWXC80
3+cWxkvd9aAvmVwn82k3NyKpI2F2DeOdZ9zxkPzEWJF1MI
dB8T0wYgK/ITlW0jwD43hg6pc2cGHD/m0XSXslX3UJ+8Sd
R5hbze+dg7w0XSr9HT6Wg==

---

The process of FIG. 4 may proceed from step 403 to step 404, where the user name and password are transmitted. By way of example, the user name and password may be transmitted as part of an authentication request. In some embodiments, the user name and password are transmitted to authentication computing device 306. In some embodiments, the user name and password are transmitted to another entity (e.g., local office 103, etc.). In an example, when the user name and password are transmitted to some other entity, the user name and password may be routed to authentication computing device 306 for authentication.

Figure 6:
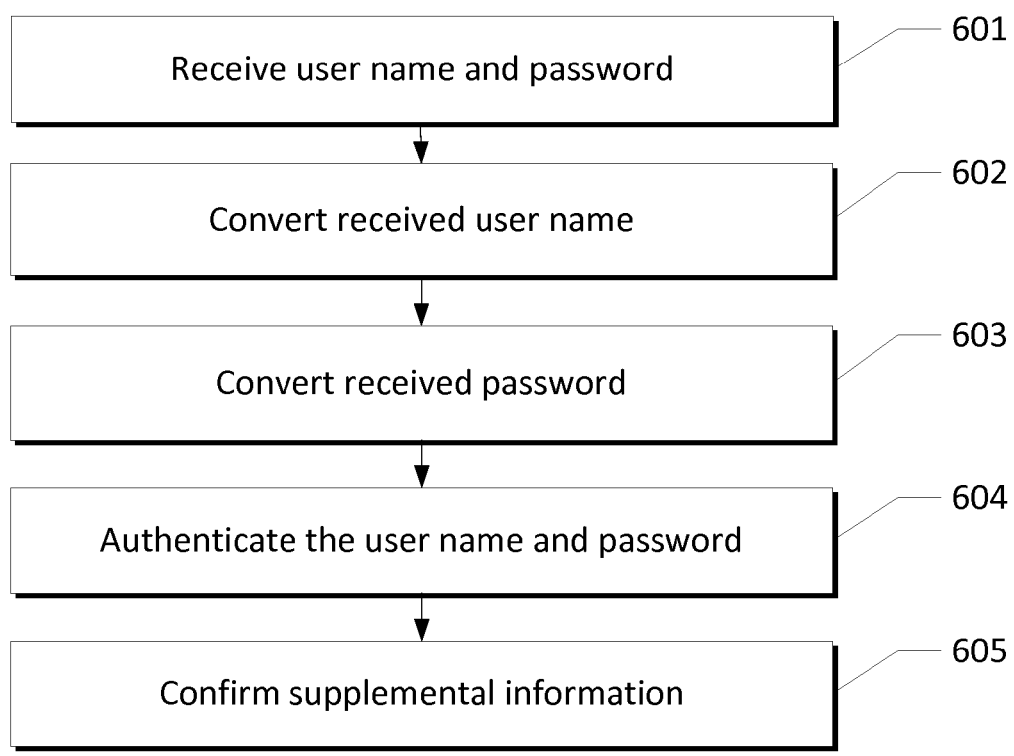
FIG. 6 illustrates an example process for authenticating a computing device according to one or more embodiments.

FIG. 6 illustrates the steps performed by authentication computing device 306 in some embodiments. The process of FIG. 6 may begin at step 601, where a user name and password may be received. In an example, the user name and password may be received from computing device 301. In another example, computing device 301 may transmit a user name and password to an entity (e.g., local office 103) and the user name and password may be routed to authentication computing device 306. In some embodiments, the user name and password may be included in a request for provisioning.

The process of FIG. 6 may proceed from step 601 to step 602, where the received user name is converted. In some embodiments, step 602 of FIG. 6 comprises the process illustrated in FIG. 7A.

Figure 7A:
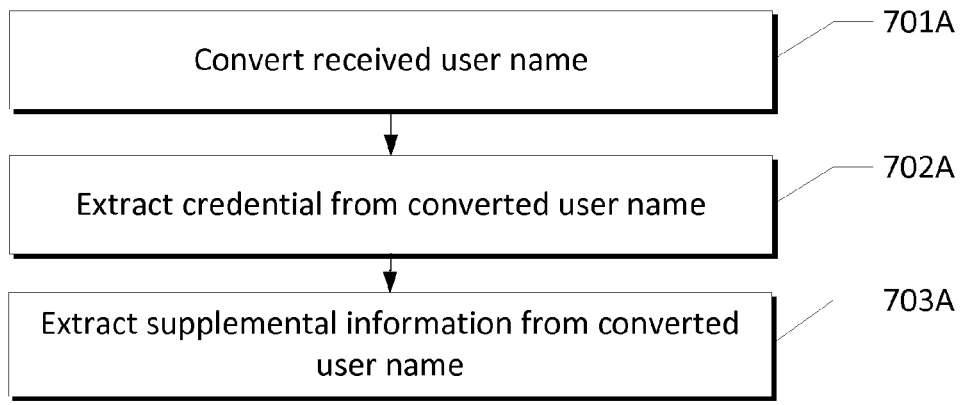
FIGS. 7A and 7B illustrate an example process for processing authentication information according to one or more embodiments.

FIG. 7A illustrates a process for processing a user name in accordance with some embodiments. The process begins at step 701A, where the received user name is converted into PEM format or any other suitable format. In some embodiments, the user name will be received in the desired format (e.g. PEM), and the converting will be unnecessary. The process of FIG. 7A may move from step 701A to step 702A, where a credential (e.g., digital certificate) is extracted from the user name. In an example, the user name may have been received as a concatenation of supplemental information and a digital certificate, and the extraction may comprise separating the digital certificate from the supplemental information. The extraction may comprise additional steps, such as converting a format for the user name, decoding the user name, separating the credential from other appended data, etc.

From step 702A the process of FIG. 7 may move to step 703A, where supplemental information is extracted from the user name. In an example, the user name may have been received as a concatenation of supplemental information and a digital certificate, and the extraction may comprise separating the digital certificate from the supplemental information. The extraction may comprise additional steps, such as converting a format for the user name, decoding the user name, separating the supplemental information from other appended data, etc.

The process of FIG. 6 may proceed from step 602 to step 603, where the received password may be converted. In an example, the received password may have been digitally signed by a computing device (e.g., computing device 301), and the conversion may include decrypting the digitally signed password. In some embodiments, step 603 of FIG. 6 comprises the process illustrated in FIG. 7B.

Figure 7B:
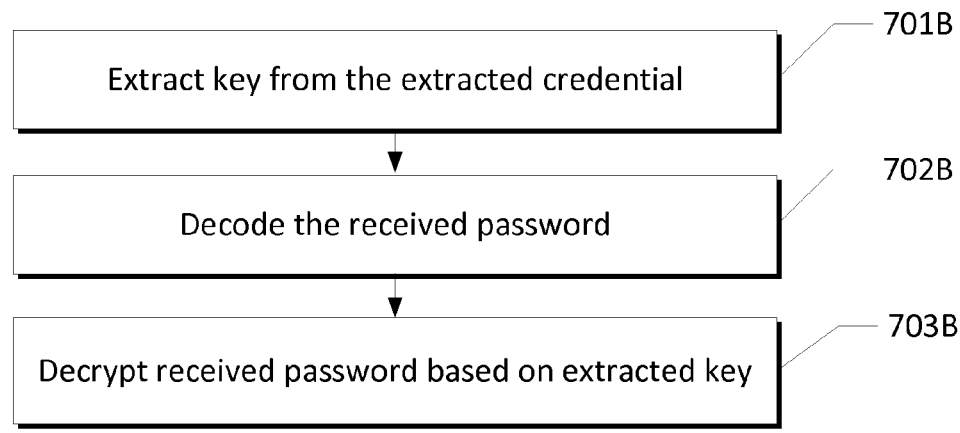

FIG. 7B illustrates a process for processing a password in accordance with some embodiments. The process begins at step 701B, where a key is extracted from the extracted credential. For example, a key may be extracted from the credential extracted at step 702A of FIG. 7A. In some embodiments, the credential comprises a digital certificate and the extracted key comprises a public key. The process may move from step 701B to step 702B, where the received password is decoded.

In some embodiments, the password may be received encoded in a Base64 scheme. In an example, the password may be decoded from the radix-64 representation to a binary representation. In some embodiments, the password may be received in various forms and any suitable means may be implemented to convert the received password to binary form. The process may move from step 702B to step 703B, where the received password is decrypted based on the extracted key (e.g., public key).

In an example, a computing device (e.g., computing device 301) may have encrypted the received password with a private key for the computing device (e.g., private key 305). In addition, the extracted credential (e.g., credential 302) may comprise a digital certificate that has been issued to the computing device (e.g., computing device 301) that transmitted the user name and password. In some embodiments, the public key for the computing device (e.g., public key 304) extracted from the credential (e.g., credential 302) may be used to decrypt the password that has been previously encrypted with the private key for the computing device (e.g., private key 305). The conversion illustrated in FIG. 7B may comprise additional steps required to convert the password, such as converting a format for the decrypted password, separating the decrypted password from other appended data, etc.

The process of FIG. 6 may proceed from step 603 to step 604, where the user name and password may be authenticated. In some embodiments, a policy for authentication computing device 306 may be defined such that the received password is expected to be a digitally signed version of the received user name. In this embodiment, authenticating the user name and password may comprise authenticating that the password is a digitally signed version of the user name. In an example, the digital signature may comprise a digest of a hashed credential (i.e., digital certificate), for instance a digest of a SHA-256 hash of the credential, where the digest is encrypted using a private key (e.g., private key 305) for the computing device seeking authentication (e.g., computing device 301).

The digital signature may be authenticated by comparing the decrypted password with a hashed version of the user name. For instance, the user name may be hashed according to SHA-256 and the digest of the hash may be compared to the decrypted password. If the comparison indicates a match, the result may indicate a positive authentication. If the comparison does not indicate a match, the result may indicate a failed authentication.

In some embodiments, a positive authentication is not indicated until the extracted credential (e.g., digital certificate) is validated. In an example, authentication computing device 306 may communicate with trusted authority 303 (e.g., certificate authority) to verify the validity of the extracted credential. The verification may include determining if the credential has been revoked. In an example, authentication computing device 306 may verify a path for the credential. For instance, it may be verified that the credential was issued by a trusted authority (e.g., trusted authority 303, certificate authority, etc.).

In an example, authentication computing device 306 may consult with one or more outside sources to determine the validity of the credential. For instance, the other sources consulted may comprise directory 307, database 308, and any other suitable computing device (e.g., computing device 309). In an example, authentication computing device 306 may inspect fields and data in the credential to determine the validity of the credential. In some embodiments, if the credential is not properly validated, the authentication computing device 306 may indicate a failed authentication.

In some embodiments, a positive authentication is not indicated until supplemental information received from the computing device requesting authentication (e.g., computing device 301) is confirmed. In an example, the supplemental information may comprise a time stamp and the time stamp may be included in the user name. At authentication computing device 306, the time stamp may be extracted from the user name, for instance, at step 703A of FIG. 7A, and the time stamp may be confirmed, for instance, at step 605 of FIG. 6 (further described below).

The process may proceed from step 604 to step 605, where supplemental information received from the computing device requesting authentication (e.g., computing device 301) is confirmed. In some embodiments, the supplemental information may comprise a time stamp. At step 703A of FIG. 7A, the time stamp may be extracted from the user name. In an example, the time stamp may comprise an 18 character time stamp that represents the UTC date and time to the subsecond at which the user name was generated.

In some embodiments, the time stamp is validated based on accessing a database that stores authentication data about computing device authentications. In an example, a database may store data about the authentications performed by authentication computing device 306. The database may be stored at authentication computing device 306 or may be operatively connected to authentication computing device 306. For example, for a positive authentication, the database may store a time stamp provided from the positively authenticated computing device in association with the credential used during authentication. In some embodiments, the database stores a portion of the credential and/or a portion of the time stamp. In some embodiments, the database stores a MAC address for the positively authenticated computing device in association with the time stamp. While a credential and a MAC address are described, the database may store any suitable identifying information for the positively authenticated computing device in association with the time stamp.

In some embodiments, validating a time stamp comprises accessing the database that stores authentication data and comparing information stored in the database with the time stamp. In an example, the computing device requesting authentication is looked up in the database, for instance, based on the credential received from the computing device, a MAC address for the computing device, or any other suitable identifying information. If a database entry is not found for the computing device, the timestamp is confirmed.

If a database entry is found for the computing device, the extracted time stamp is compared to the time stamp stored in the database for the computing device. If the extracted time stamp is chronologically before the stored time stamp, the time stamp is not confirmed and the computing device fails authentication. In some embodiments, if the extracted time stamp is identical to the stored time stamp, the time stamp is not confirmed and the computing device fails authentication. If the extracted time stamp is chronologically after the stored time stamp, the time stamp is confirmed. In some embodiments, the time stamp is confirmed when a duration between the extracted time stamp and the stored time stamp is greater than a predetermined threshold.

After the time stamp is confirmed, the database may store an entry for the positively authenticated computing device comprising identifying information for the positively authenticated computing device (e.g., a credential, a MAC address, etc.) in association with the confirmed time stamp. The database may store a predetermined number of confirmed time stamps (e.g., the last five previously confirmed time stamps). In some embodiments, authentication computing device 306 is configured to ignore time stamps and the authentication process does not include verifying the time stamp.

In some embodiments, the supplemental information comprises a randomly generated number and the randomly generated number is confirmed. In an example, the user name received from the computing device requesting authentication (e.g., computing device 301) comprises a credential and a randomly generated number. At step 703A of FIG. 7A, the randomly generated number may be extracted from the user name. In such an embodiment, when a computing device is positively authenticated, the database may store the randomly generated number in association with identifying information for the computing device (e.g., MAC address, credential issued to the device, etc.) instead of the time stamp.

In an example, a computing device requesting authentication is looked up in the database, for instance, based on the credential received from the computing device, a MAC address for the computing device, or any other suitable identifying information. If a database entry is not found for the computing device, the randomly generated number is confirmed.

If a database entry is found for the computing device, the extracted randomly generated number is compared to the randomly generated number stored in the database for the computing device. If the extracted randomly generated number is equal to the randomly generated number stored in the database, the randomly generated number is not confirmed and the computing device is not authenticated. If the extracted randomly generated number is not equal to the randomly generated number stored in the database, the randomly generated number is confirmed and the computing device is authenticated.

In some embodiments, a user name may comprise any credential that includes a public key and a password may comprise any information that is known to an authenticating entity (e.g., authenticating computing device 306) and that is encrypted by a private key corresponding to the public key from the user name. In such an embodiment, the authenticating entity (e.g. authenticating computing device 306) may authenticate the username and password by decrypting the password based on the public key included in the user name.

This decrypted password may then be verified against the information known to the authenticating entity.

In some embodiments, a user name may comprise any credential that includes a public key and any additional information and a password may comprise any portion of the user name encrypted with a private key corresponding to the public key from the user name. In such an embodiment, the authenticating entity (e.g. authenticating computing device 306) may authenticate the username and password by decrypting the password based on the public key included in the user name. This decrypted password may then be verified against the corresponding portion of the received user name. In embodiments described above, the password comprises an encrypted user name but the password may comprise any portion of the user name that is encrypted.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This disclosure is limited only as defined in the following claims and equivalents thereto.

We claim:

1. A method comprising:
   receiving, from a computing device, an authentication request comprising a user name and a corresponding password, wherein:
      the user name is in a first format, and comprises:
         a value that is based on a time at which the user name was generated; and
         a public key for the computing device; and
      the password is encrypted, and is generated based on the user name;
   extracting the public key from the user name;
   decrypting the password, based on the public key, to create a decrypted password;
   converting the user name from the first format to a second format;
   comparing the decrypted password to the second format user name;
   verifying, based on the value, the authentication request; and
   in response to determining that the decrypted password corresponds to the second format user name, and in response to the verifying the authentication request, granting the authentication request from the computing device.

2. The method of claim 1, wherein the password comprises a converted version of the user name, wherein the converted version of the user name has been encrypted using a private key for the computing device.

3. The method of claim 1, wherein the user name comprises a digital certificate issued to the computing device from a trusted authority.

4. The method of claim 1, wherein the password comprises a digital signature of the user name.

5. The method of claim 1, wherein the converting the user name to the second format comprises hashing the user name, and wherein the decrypted password comprises a hash of the user name.

6. The method of claim 1, further comprising:
   verifying the authentication request by:
      extracting the value from the user name, wherein the value comprises a time; and
      determining, based on comparing the time from the value to a time of a stored time stamp associated with a previous authentication of the computing device, whether to verify the value.

7. The method of claim 6, wherein the verifying the value is performed in response to determining that a difference between the time from the value and the time of the stored time stamp is greater than a threshold.

8. A system comprising:
   a computing device comprising:
      a first processor; and
      a memory storing instructions that, when executed by the first processor, cause the computing device to:
         generate an authentication request comprising a user name and a corresponding password, wherein:
            the user name is in a first format, and comprises:
               a value that is based on a time at which the user name was generated; and
               a public key for the computing device; and
            the password is encrypted, and is generated based on the user name;
         send the authentication request; and
   an authentication device comprising:
      a second processor; and
      a memory storing instructions that, when executed by the second processor, cause the authentication device to:
         receive, from the computing device, the authentication request;
         extract the public key from the user name;
         decrypt the password, based on the public key, to create a decrypted password;
         convert the user name from the first format to a second format;
         compare the decrypted password to the second format user name;
         verifying, based on the value, the authentication request; and
         in response to determining that the decrypted password corresponds to the second format user name, and in response to the verifying the authentication request, grant the authentication request from the computing device.

9. The system of claim 8, wherein the verifying the authentication request comprises:
   extracting the value from the user name, wherein the value comprises a time stamp;
   comparing the time stamp of the value to a previous time stamp that is associated with the computing device; and
   determining that the time stamp of the value is valid in response to determining that the previous time stamp is chronologically earlier in time to the time stamp of the value.

10. The system of claim 9, wherein the determining that the time stamp of the value is valid in response to determining that the previous time stamp is chronologically earlier in time to the time stamp of the value comprises:
   determining that a duration between the time stamp of the value and the previous time stamp is greater than a threshold.

11. The system of claim 8, wherein the password has been encrypted using a private key for the computing device, and wherein the public key is associated with the private key.

12. The system of claim 8, wherein the user name comprises a digital certificate issued to the computing device from a trusted authority.

13. The system of claim 8, wherein the verifying the authentication request comprises:
- extracting the value from the user name, wherein the value comprises a random number;
- comparing the random number of the value to a previous random number that is associated with the computing device; and
- determining that the random number of the value is valid in response to determining that the previous random number is different from the random number of the value.

14. A method comprising:
- receiving, from a computing device, an authentication request comprising a user name and a corresponding password, wherein:
  - the user name is in a first format, and comprises:
    - a random number that is based on a time at which the user name was generated; and
    - a public key for the computing device; and
  - the password is encrypted, and is generated based on the user name;
- extracting the public key from the user name;
- decrypting the password, based on the public key, to create a decrypted password;
- converting the user name from the first format to a second format;
- comparing the decrypted password to the second format user name;
- verifying, based on the random number, the authentication request; and
- in response to determining that the decrypted password corresponds to the second format user name, and in response to the verifying the authentication request, granting the authentication request from the computing device.

15. The method of claim 14, further comprising:
- extracting, from the user name, the random number, wherein the random number is associated with an identification of the computing device; and
- verifying the random number.

16. The method of claim 15, wherein the verifying the random number comprises:
- comparing the extracted random number to a previous random number associated with the computing device; and
- authenticating the extracted random number if the previous random number is different from the extracted random number.

* * * * *